United States Patent [19]

Meier et al.

[11] Patent Number: 4,799,364
[45] Date of Patent: Jan. 24, 1989

[54] DISCOID COLD CARTRIDGE INSERTABLE INTO AN ICE-CREAM MAKER

[75] Inventors: Otto Meier, Keutschach; Kurt Sadek, Rain bei Ebenthal; Zvonko Sikoronja, Klagenfurt, all of Austria; Johann Schröder, Aachen, Fed. Rep. of Germany

[73] Assignee: U.S. Philips Corp., New York, N.Y.

[21] Appl. No.: 877,563

[22] Filed: Jun. 23, 1986

[30] Foreign Application Priority Data

Jun. 26, 1985 [AT] Austria ................................ 1905/85

[51] Int. Cl.⁴ .............................................. A23G 9/12
[52] U.S. Cl. ........................................ 62/342; 62/529; 165/10
[58] Field of Search ................... 62/342, 529, 530; 165/10 A; 220/357

[56] References Cited

U.S. PATENT DOCUMENTS

| | | | |
|---|---|---|---|
| 2,203,591 | 6/1940 | Brown | 62/530 |
| 3,095,291 | 6/1963 | Robbins | 62/530 |
| 3,802,220 | 4/1974 | Pomps | 62/530 |
| 3,922,879 | 12/1975 | Arnold | 62/529 X |
| 4,019,340 | 4/1977 | Conklin | 62/530 X |
| 4,205,535 | 6/1980 | Maurer | 62/342 |
| 4,211,208 | 7/1980 | Lindner | 165/10 A X |
| 4,248,291 | 2/1981 | Jarmul | 165/10 A |
| 4,434,891 | 3/1984 | Skinner et al. | 220/357 X |
| 4,612,974 | 9/1986 | Yanadori et al. | 126/400 |
| 4,712,386 | 12/1987 | Bukoschek | 62/342 |

FOREIGN PATENT DOCUMENTS

| | | | |
|---|---|---|---|
| 59402 | 4/1891 | Fed. Rep. of Germany | 62/529 |
| 71834 | 6/1894 | Fed. Rep. of Germany | 62/529 |
| 2627022 | 12/1977 | Fed. Rep. of Germany | 165/10 A |
| 3322956 | 1/1985 | Fed. Rep. of Germany | 165/10 A |
| 8438146 | 4/1985 | Fed. Rep. of Germany | . |

Primary Examiner—William E. Tapolcai
Attorney, Agent, or Firm—E. C. Bartlett

[57] ABSTRACT

A discoil cold cartridge filled with a latent heat storage medium of which a discoid main wall (1) serves to act together with a scraper and stirrer of an ice-cream maker, is formed by at least two parts joined together, of which one part consists of the discoid main wall (1) facing the scraper and stirrer tool and the other part of a trough-shaped base (2). The discoid main wall (1) serves to act together with the scraper and stirrer tool and is designed as an inherently stable die-cast part least one wall of the base (2) is itself reversibly adaptable to the change in volume of the latent heat storage medium in phase transition.

16 Claims, 2 Drawing Sheets

DISCOID COLD CARTRIDGE INSERTABLE INTO AN ICE-CREAM MAKER

The invention relates a discoid cold cartridge insertable into an ice-cream maker, which is filled with a latent heat storage medium and of which a discoid main wall serves to act together with a scraper and stirrer tool of an ice-cream maker. An ice-cream maker serving as a domestic appliance has been previously disclosed in DE-OS No. 28 31 592 which corresponds to U.S. Pat. No. 4,205,535, in which a cold cartridge of this type is used, which can preferably be divided in a meridian plane, without any further details being given of its construction.

SUMMARY OF THE INVENTION

The object of the invention is to design a cold cartridge of the aforementioned type having a simple construction, guaranteeing efficient operation of the ice-cream maker so that ice-cream can be produced efficiently and of high quality. The object is attained, according to the invention with a cold cartridge of this type formed from at least two parts joined together, of which one part consists of the discoid main wall facing the scraper and stirrer tool and the other part of a trough-shaped base. The discoid main wall acting together with the scraper and stirrer tool is designed as an inherently stable die-cast part and that at least one wall of the base is itself adaptable to the change in volume of the latent heat storage medium in phase transition. The discoid main wall with which the scraper and stirrer tool interacts has a stable, non-changing form, achieved simply by its design as a die-cast part, the scraper and stirrer mechanism can continually efficiently and uniformly scrape off any ice-cream attaching to this discoid main wall and mix and rotate it with the not yet frozen ice-cream mixture. This is essential to the production of good quality of ice-cream. The base allows a change in volume of the latent heat storage medium occurring in its phase transition between fluid and solid and vice versa. At least one wall of the base can adapt to such a change in volume as a result of its flexibility, this being obtainable through a suitable selection of shaping, material and wall thickness. Thus the discoid main wall which acts together with scraper and stirrer tool always retains its shape, whereas changes in volume of the latent heat storage medium are compensated for by the base.

It should be mentioned at this point that it is known in the art for the walling of accumulators of cold art to be flexible so that changes in volume of the latent heat storage medium do not lead to damage to the cold temperature accumulator, as specified in DE-OS No. 28 46 988, which corresponds to U.S. Pat. No. 4,324,287. However, changes in form in the accumulator shown therein are not perceived to have a detrimental effect, since a tool or similar item does not act together with any wall section. In order to compensate for such changes in volume of a latent heat storage medium a proposal has alredy been made in the case of an ice-cream maker according to DE-GM No. 84 38 146 for joining the inherently stable base of a double-walled vessel containing the latent heat storage medium with the housing of the vessel by means of a flexible ring. This permits the inherently rigid bottom wall to yield as a whole to the changes in volume of the latent heat storage medium. However, such a design is very laborious and costly to manufacture. In contrast, in the case of a discoid cold cartridge this can be achieved very simply through the measures according to the invention, in that the discoid main wall acting together with the scraper and stirrer tool does not change its form and the change in volume of the latent heat storage medium is compensated in phase transition by at least one inherently flexible wall of the base.

For the inherent stability of the discoid main wall acting together with the scraper and stirrer tool it is the wall thickness of the die-cast part which is of importance. It has proven to be particularly advantageous to provide the die-cast part with fins projecting into the inside of the cold cartridge. Through the provision of such fins the inherent stability of the discoid main wall interacting with the scraper and stirrer tool is quite substantially increased, whereby the demands made on the wall thickness of the die-cast part are reduced. There are various possibilities for the shaping of such fins, whereby excellent stability is obtained in quite a simple manner with radially projecting fins. The fins may also have a honeycomb structure. Such fins offer a further advantage. Since the fins project into the inside of the cold cartridge they are inside the latent heat storage medium, and act as heat conductors from the latent heat storage medium to the discoid main wall interacting with the scraper and stirrer tool. Heat exchange with the discoid main wall, thereby promoting a uniform formation of ice-cream on this discoid main wall is thereby favored.

It has further proven to be advantageous for the die-cast part to have a curved shape. As a result of such a curvature the inherent stability of the discoid main wall acting together with the scraper and stirrer tool is also increased.

The curvature of the discoid main wall which acts together with the scraper and stirrer tool may, for example, be conical. It has proven to be particularly advantageous for the curvature of the die-cast part to be cap-shaped. This affords a particularly high inherent stability.

Yet another advantage is gained through a curvature of the discoid main wall acting together with the scraper and stirrer tool. It is essential that the cold cartridge is as far as possible completely filled with the latent heat storage medium, so that it contains no air bubbles which would collect on the discoid main wall acting together with the scraper and stirrer tool when the cold cartridge is in operating position in the ice-cream maker. Bubble formation considerably impairs the transmission of heat between the latent heat storage medium and the discoid main wall, thus impeding the formation of ice-cream in the vicinity of the air bubbles. This would not result in uniform formation of ice-cream. The result of the curvature of the discoid main wall is that any air bubbles inside the cold cartridge will always collect at the highest point of the cold cartridge. Should the cold cartridge, for example, be curved inwards, any air bubbles will then collect around the edge of the cold cartridge, where they are less of a problem, since the other major part of the discoid main wall is in excellent heat contact with the latent heat storage medium and thus guarantees efficient formation of ice-cream. In this context it has proven to be particularly advantageous for the die-cast part to be curved outwards. In this way any air bubbles collect in the centre of the cold cartridge where the scraper and stirrer tool has its smallest effect, so that the formation of ice-cream is practically unhindered.

It has further proven to be advantageous for the bottom wall to run essentially parallel to the curvature of the die-cast part and for a sealable filling opening for the latent heat storage medium to be provided in one of the two curved walls which is curved outwards. In this way the filling opening is always located at the highest point of the cold cartridge when filling with latent heat storage medium, thus guaranteeing that it can be filled as completely as possible with latent heat storage medium and contains practically no more air bubbles.

There are various possibilities for joining the die cast part to the trough-shaped base. If, for example, the trough-shaped base is made from special steel plate, it is possible to select a bonded connection with a metal adhesive. It has proven to be particularly advantageous for the die-cast part to be provided with a groove in the region of its circumference facing the base, for the trough-shaped base to be provided with an upper edge angled outwards, which fits perfectly into the groove of the die-cast part, and for a clamping ring gripping over the angled edge of the base to be inserted into the groove of the die-cast part to join together the base and the die-cast part. As it is a very simple matter to produce a groove in a die-cast part this method of joining the two parts is very simple and very safe.

Bearing in mind that at least one of its walls can adapt reversibly even to the change in volume of the latent heat storage medium in phase transition, there are also various possibilities for the design of the base, one essential parameter being the selection of the wall thickness. Material and shape, however, also play an importsant role. Hence it has also proven to be very advantageous for the bottom wall of the base to be provided with beads. In this way the bottom wall of the base is very highly flexible.

In terms of design and manufacture it has proven to be particularly simple for the trough-shaped base to be composed of resiliently flexible plastic. It should be mentioned thereby, that in the case of cold cartridges of the general art it is known for these to be manufactured completely from plastic, as specified, for example, in the aforementioned DE-OS No. 2846 988 or U.S. Pat. No. 4,324,287. In contrast, however, in this particular case only the base of a cold cartridge, which should be inherently flexible, is manufactured from a resiliently flexible plastic, whereas the discoid main wall of the cold cartridge acting together with the scraper and stirrer tool is inherently stable.

In this context it has further proven to be advantageous for the trough-shaped base to be composed of transparent resiliently flexible plastic. In this way the state of the latent heat storage medium inside the cold cartridge can be determined visually, it being quite simple to check, for example, whether or not the latent heat storage medium has completely frozen prior to the use of the cold cartridge.

It has also proven to be advantageous for a gas spring containing a yielding occluded gas to be arranged inside the base in the vicinity of the bottom wall. With the use of such a gas spring containing, for example, air it is possible to partially compensate for the changes in volume of the latent heat storage medium, as a result of which only minimal demands are made of the flexibility of the base, resulting in advantages for the design.

There are various possibilities for the design of such a gas spring. Thus it may, for example, comprise a flat container with flexible walls or a spirally wound rubber hose sealed at both ends. It was proven to be particularly simple and advantageous for the gas spring to consist of a foam rubber disc. Such a foam rubber disc, which consists, for example, of natural rubber or silicon rubber with mainly closed pores, is not only simple and economical but also offers the further advantage of having a heat-insulating effect. Heat loss from the base of the cold cartridge is avoided and heat exchange with the discoid main wall interacting with the scraper and stirrer tool is enhanced promoting the formation of ice-cream on this discoid main wall.

It has also proven to be advantageous for an abutment to be provided in the centre of the die-cast part for the scraper and stirrer tool of the ice-cream maker and for this abutment to be formed by a part raised from the die-cast part and usable as a handle. Such an abutment for the scraper and stirrer tool, which is already known from the aforementioned DE-GM No. 84 38 146 in the form of an abutment shaped as a recess, ensures a safe action of the latter together with the cold cartridge. In this particular case a further advantage is offered by this abutment being formed by a part raised from the die-cast part in that this first part can be used as a handle so that manipulation of the cold cartridge is rendered particularly simple during insertion and removal of the cold cartridge into the ice-cream maker.

In this context it has proven to be particularly advantageous for the abutment to be designed as a sealable filling opening for the latent heat storage medium. In this manner the provision of a separate filling opening is rendered superfluous and this can be located at a sufficiently high position for the cold cartridge to be filled as completely as possible with latent heat storage medium.

It has further proven to be advantageous for the ratio of the surface area in $cm^2$ of the discoid main wall serving to act together with the scraper and stirrer tool to the volume in $cm^3$ of the latent heat storage medium to lie between 0.3 and 0.6. With this size of cold cartridge there is an excellent transmission of heat from the latent heat storage medium to the discoid main wall acting together with the scraper and stirrer tool, as a result of which a uniform formation of ice-cream is obtained.

In this context it has proven to be particularly advantageous for the ratio of surface area in $cm^2$ of the discoid main wall acting together with the scraper and stirrer tool to the volume in $cm^3$ of the latent heat storage medium to be between 0.34 and 0.39. A particularly favourable heat transmission from the latent heat storage medium to the discoid main wall is thus obtained, whereby the formation of ice-cream is neither too rapid nor too slow, as a result of which there are neither lumps, nor is the formation of ice-cream insufficient due to excessive heat losses.

In the case of the aforementioned cold cartridges it has also proven to be very useful for these to be filled with a latent heat storage medium on the basis of a eutectic mixture of water and a salt hydrate, which contains a further 0.1 to 6 percent by volume of a second water-salt hydrate eutectic, the melting point of which is lower than that of the pure latent heat storage medium. Such latent heat storage mediums are known from the aforementioned DE-OS No. 28 46 988 or U.S. Pat. No. 4,324,287, but amongst the large number of other known latent heat storage mediums these are particularly suitable for use in a cold cartridge of this type for an ice-cream maker, as they have a particularly uniform expansion in phase transition, as a result of which the danger of damage to the flexible base is significantly reduced.

The invention will be described in further detail with reference to the diagrams, which show several embodiments of the invention, to which it should not however be restricted.

DESCRIPTION OF THE PREFERRED EMBODIMENT

Figure 1:
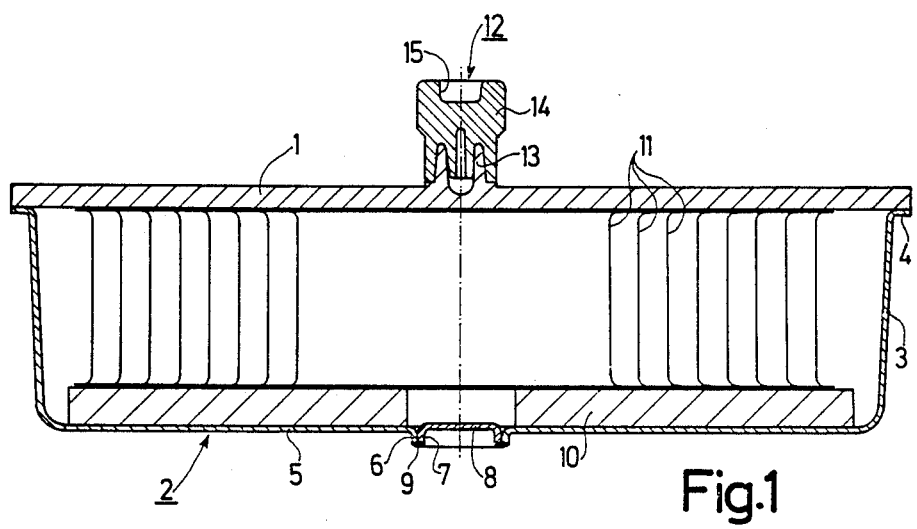
FIG. 1 shows a cold cartridge in which the discoid main wall acting together with the scraper and stirrer tool takes the form of a flat die-cast part, which is provided in its centre with an abutment for the scraper and stirrer tool in the form of a handle.

The cold cartridge shown in FIG. 1 consists of two parts joined together, of which one part is the discoid main wall 1 facing the scraper and stirrer tool of the ice-cream maker and the other part is a trough-shaped base 2. The discoid main wall 1 is designed to be inherently stable, which is important to ensure that scraper and stirrer tool can act efficiently with it, so that ice-cream forming on it can be scraped off efficiently and uniformly. The inherent stability is obtained in a simple manner in that the discoid main wall 1 consists of a flat-shaped die-cast part. The trough-shaped base 2, on the other hand, is designed such that at least one of its walls is flexible, so that the base can adapt reversibly to changes in volume of a latent heat storage medium filled into the cold cartridge on phase transition of the latter between fluid and solid and vice versa and hence the discoid main wall 1 is not deformed as a result. Such changes in volume may constitute several percent by volume, so that the base has to be correspondingly flexible, which is obtained by a relatively thin wall thickness or an appropriate shape. Particularly suitable materials for the base are plates of special steel, for example chrome, nickel steel, which are resistant to corrosion and are suitable for deep drawing and welding, whereby a wall thickness of 0.8 mm, for example, could be used to ensure the required flexibility. Suitable materials for the die-cast part are aluminium or aluminium alloys, either with silicon or magnesium, since these materials are safe to use with foodstuffs, whereby a wall thickness of, for example, 3 mm can be used to obtain the required inherent stability. If the corrosion resistance of such a die-cast part is to be increased further, in particular with regard to the latent heat storage medium, it may be provided with a coating.

The trough-shaped base 2 has an edge 4 angled outwards at the top end of its circumferential walling 3, onto which the die-cast part forming the discoid main wall 1 is fitted around its circumference. The joining of the two parts occurs in this case, for example, by means of a metal adhesive which is applied to the angled edge 4 and/or the peripheral zone of the die-cast part. An opening with an outwardly flanged edge 6 is provided in the bottom wall 5 of the base 2, serving for the filling of a latent heat storage medium into the cold cartridge. After filling with this latent heat storage medium this opening is sealed with a plate 8 also having a flanged edge 7, after which the free ends of the flanged edges 6 and 7 are joined together by means of a welded seam 9. It is essential that the cold cartridge is filled as completely as possible with latent heat storage medium so that it contains no air bubbles which would collect at the highest point of the cold cartridge in its operating position as shown in FIG. 1, which would be in the vicinity of the discoid main wall 1. Such air bubbles would considerably impair the transmission of heat between the latent heat storage medium and the discoid main wall 1, which would lead to an irregular formation of ice-cream on the discoid main wall 1. It should be mentioned that the base 2 does not necessarily have to be designed as a single part, but may also be composed of several parts, for example of a circumferential walling 3 and a separate bottom wall 5, which could then be joined to a through-shaped base section 2 by means of a welded joint.

A gas spring, in this case in the form of a foam rubber disc 10, is arranged inside the cold cartridge in the vicinity of the bottom wall 5 of the base 2. Such a foam rubber disc, which is made of, for example, natural rubber or silicon rubber with mainly closed pores, has the property of being resiliently flexible and thus capable of compensating in part for the change in volume of the latent heat storage medium in phase transition, whereby the demands made of the flexibility of the base part 2 are reduced. Such a foam rubber disc also has a heat-insulating effect, thus reducing heat loss from the base and promoting the formation of ice-cream on the discoid main wall 1.

There are of course other possible designs for such a gas spring containing a yielding occluded gas. Such a gas spring may also comprise a flat container with flexible walls. It has also proven to be simple for the gas spring to consist of a spirally wound rubber hose sealed at both ends. Such gas springs may contain air or a special gas.

It has also proven to be appropriate for the ratio of surface area in $cm^2$ of the discoid main wall 1 serving to act together with the scraper and stirrer tool to the volume in $cm^3$ of the latent heat storage medium to lie between 0.3 and 0.6, preferably between 0.34 and 0.39. In this way a good transmission of heat between the latent heat storage medium and the discoid main wall 1 is obtained, which on the one hand does not proceed too rapidly, nor on the other hand too slowly, so that the formation of ice-cream occurs efficiently and uniformly. If the transmission of heat were to occur too rapidly this might result in the formation of lumps in the ice-cream, or the ice-cream forming could freeze too solidly onto the discoid main wall 1 so that it could no longer be scraped off efficiently by the scraper and stirrer tool. In the case of too slow a transmission of heat this might result in greater losses of heat which could have the consequence of not enough ice-cream being formed. It has proven to be very effective for the latent heat storage medium to be one which is based on a eutectic mixture of water and a salt hydrate which contains a further 0.1 to 6 percent by volume of a second water-salt hydrate eutectic, the melting point of which is lower than that of the pure latent heat storage medium. Such latent heat storage medium have in particular the property of a uniform expansion in phase transition which is advantageous in respect of the required flexibility of the base 2, since with a uniform expansion the danger of damage to the base 2 is significantly reduced.

Furthermore, heat-conducting plates 11 are arranged inside the cold cartridge, which are in heat-conducting contact with the discoid main wall 1. The transmission of heat from the latent heat storage medium to the discoid main wall 1 is thereby particularly favoured in the known manner. These heat-conducting plates may, for example, consist of a spirally wound copper strip, of which both edges are angled, whereby the cone angle is supported on the discoid main wall 1 and the other angle on the form rubber disc 10. Other shapes and materials are of course also suitable for such heat-conducting plates, although it is always important that they should be in good heat-conducting contact with the discoid main wall 1.

As FIG. 1 shows, an abutment 12 is provided for the scraper and stirrer tool in the centre of the discoid main wall 1 in the form of a part raised from the latter. The die-cast part forming the discoid main wall 1 has an outward elevation 13, on which a substantially cylindrical part 14 is fixed. This part 14 is provided with a central recess 15, which forms the abutment 12 for a free end of the scraper and stirrer tool, so that this can interact particularly safely with the discoid main wall 1. As can be seen, the raised part 14 can be used as a handle, as a result of which the cold cartridge is simple to manipulate, in particular for its insertion into the ice-cream maker and its removal from the latter.

Figure 2:
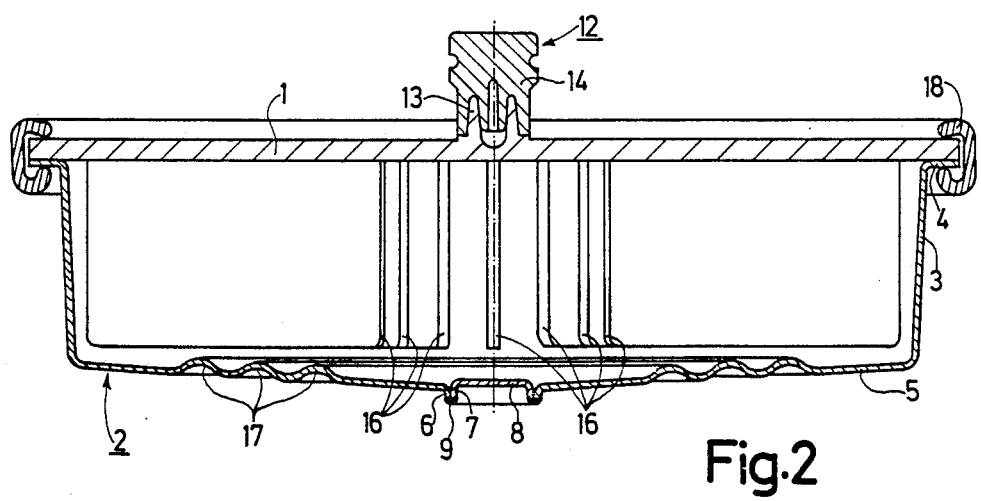
FIG. 2 shows a cold cartridge in which the discoid main wall acting together with the scraper and stirrer tool is constituted by a flat die-cast part provided with fins projecting into the inside of the cold cartridge, having in its centre an abutment for the scraper and stirrer tool in the form of a handle and the bottom wall of the base is provided with beads.

In the embodiment according to FIG. 2 the discoid main wall 1 is again formed by a flat die-cast part which in this case however is provided with several fins 16 projecting into the inside of the cold cartridge. These fins 16 project radially with an angular displacement. In this way a particularly high inherent stability of the die-cast part and hence the discoid main wall 1 acting together with the scraper and stirrer tool is obtained. If required, these fins may be supplemented by further annular fins to form a honeycomb structure, as a result of which the inherent stability can be increased even further. The provision of such fins projecting into the inside of the cold cartridge produces a further advantage, namely that they conduct heat from the latent heat storage medium, into which they extend, to the discoid main wall 1 and thus favour the exchange of heat to the discoid main wall, thus promoting an efficient and uniform formation of ice-cream on this discoid main wall 1. Since these fins 16 form a single part with the discoid main wall 1, namely the die-cast part, the transmission of heat from the fins to the discoid main wall is particularly good.

In this particular embodiment the bottom wall 5 of the trough-shaped base 2 is provided with beads 17, thus providing the bottom wall 5 with a particularly good reversible flexibility. If required, the circumferential walling 3 of the base 2 may also, for example, be designed as a corrugated spring bellows, which would equally serve to increase the flexibility of the base 2, since the whole base 2 would then be highly flexible. To join the base 2 to the die-cast part forming the discoid main wall 1 a clamping ring 18 with a U-shaped cross section is provided, which grips the angled edge 4 of the circumferential wall 3 of the base 2 and the die-cast part around its circumference and holds these pressed against each other.

In the centre of the discoid main wall 1 an abutment 12 designed as a handle is again provided for the scraper and stirrer tool which consists of a substantially cylindrical part 14, the peripheral area of which however forms the abutment 12. For such an abutment 12 a recess corresponding to the cylindrical part 14 of the abutment 12 is provided at the end of the central part of the scraper and stirrer tool of the ice-cream maker which faces the discoid main wall 1. Through such an arrangement of the scraper and stirrer tool in the vicinity of the coid cartridge it is again ensured that any ice-cream forming on the discoid main wall 1 is scraped off efficiently and uniformly by the scraper and stirrer tool.

Figure 3:
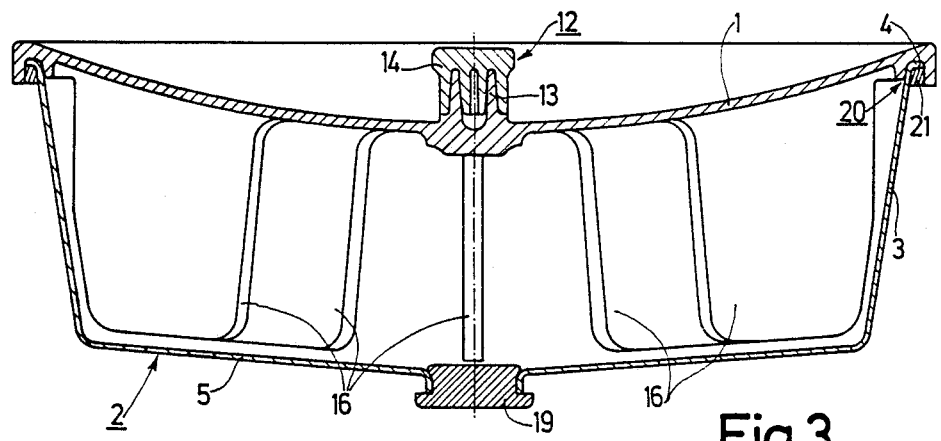
FIG. 3 shows a cold cartridge in which the discoid main wall acting together with the scraper and stirrer tool takes the form of a die-cast part curved inwards in a cap shape with fins projecting into the inside of the cold cartridge, having in its centre an abutment for the scraper and stirrer tool in the form of a handle.

In the embodiment according to FIG. 3 the die-cast part forming the discoid main wall 1 acting together with the scraper and stirrer tool is curved inwards, whereby the curvature has a cap shape. Furthermore, the die-cast part is provided with fins 16 projecting into the inside of the cold cartridge. In this way a particularly high inherent stability of the discoid main wall 1 acting together with the scraper and stirrer tool is obtained, whereby the fins 16 again ensure a good transmission of heat from the latent heat storage medium to the discoid main wall 1. In the centre the die-cast part is provided with an abutment 12 which can be used as a handle, with a design identical to that in the embodiment according to FIG. 2.

The trough-shaped base 2 is in this case provided with a bottom wall 5 curving conically outwards, running essentially in parallel to the curvature of the die-cast part. In the centre of this bottom wall 5 a sealable opening for the latent heat storage medium is provided with a stopper 19, which thus lies at the highest point of the cold cartridge when latent heat storage medium is being added, so that the former can be filled as completely as possible and thus contains practically no air bubbles. Should there nevertheless still be air bubbles in the cold cartridge, the curvature of the die-cast part forming the discoid main wall 1 essentially designed to increase stability has a further advantage, because such air bubbles would collect at the highest point of the curvature, which in the case of the present embodiment would be in the region of the circumference of the discoid main wall, where they would not significantly impair the formation of ice-cream, since the remaining, major part of the discoid main wall 1 is in good heat contact with the latent heat storage medium and thus ensures an efficient formation of ice-cream.

The base 2 could again, for example, be made from special steel plate. It has proven to be very simple and advantageous for the base 2 to be manufactured from a resiliently flexible plastic, whereby an excellent resilience of the base, which could for example have a wall thickness of 1.2 mm, is obtained. In this way the base 2 can adapt very well to the change in volume of the latent heat storage medium in phase transition. A transparent resiliently flexible plastic could be used to particular advantage in this case, since the state of aggregation of the latent heat storage medium can then be determined visually. It can then be established quite simply, for example, whether the latent heat storage medium contained in the cold cartridge is completely frozen and whether the cold cartridge is thus ready for ice-cream production.

The circumferential wall 3 of the base 2 is provided at its upper end with an edge 4 angled outwards, which serves for connection to the die-cast part forming the discoid main wall 1. The die-cast part correspondingly has a groove 20 in the region of its circumference facing the base 2, into which the edge 4 fits perfectly. A clamping ring 21 is then inserted into the groove 20, which grips over the edge 4 of the base section 2, thus constituting a simple and stable connection between the base section and the die-cast part.

Figure 4:
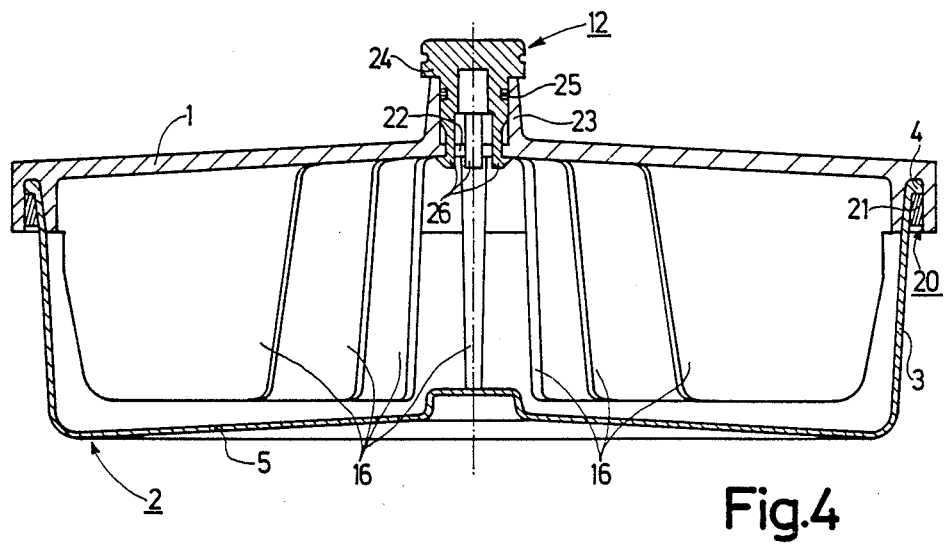
FIG. 4 shows a cold cartridge in which the discoid main wall acting together with the scraper and stirrer tool takes the form of a die-cast part curved spherically outwards with fins projecting into the inside of the cold cartridge, having in its centre an abutment for the scraper and stirrer tool in the form of a handle, serving as a sealable filling opening for the latent heat storage medium.

In the embodiment according to FIG. 4, the die-cast part forming the discoid main wall 1, again provided with fins 16 projecting into the inside of the cold cartridge, is curved conically outwards. Such a curvature, in addition to increasing the inherent stability of the die-cast part, offers the further advantage that any air bubbles in the cold cartridge collect in the centre of the discoid main wall 1, where they do not impair the formation of ice-cream, since the scraper and stirrer tool has its least effect there and there is thus no formation of ice-cream. The bottom wall 5 of the base 2 preferably manufactured from resiliently flexible plastic is in this embodiment curved inwards, whereby an excellent flexibility of the base 2 is obtained, since a bottom wall shaped in this way can adapt particularly well to the change in volume of latent heat storage medium in phase transition. The joining of the base 2 to the die-cast part forming the discoid main wall 1 proceeds in the same manner as in the emmbodiment according to FIG. 3 with a clamping ring 21, which is inserted into a circumferential groove 20 on the die-cast part, whereby it grips over the angled edge 4 provided on the circumferential wall 3 of the base 2 and thus joins the two parts securely together.

In the centre of the die-cast part forming the discoid main wall 1 an abutment 12 also designed in this embodiment as a handle is provided for the scraper and stirrer tool, which corresponds in its function to that shown in the embodiment in FIG. 2. This abutment 12 is, however, also designed in this case as a sealable filling opening for the latent heat storage medium. The die-cast part has an opening 22 at its centre and a connection piece 23 directed outwards, the opening of which can be sealed with a stopper 24, which with its peripheral area continuing beyond the connecting piece 23 forms the abutment 12 for the scraper and stirrer tool. For efficient sealing a gasket 25 is inserted into the shaft of the stopper 24. To secure the stopper 24 on the connection piece 23 several hooks 27 arranged with angular displacement are provided on it which grip resiliently over the edge of the opening 22 provided in the die-cast part from the inside. The filling opening designed in this way lies at the highest point of the cold cartridge, whereby it is ensured that the latter can be filled as completely as possible with latent heat storage medium.

As is clear from the above, there is a series of variations of the described embodiments without departing from the scope of the invention. This applies in particular to the design of the inherently stable die-cast part forming the discoid main wall 1 and the at least partially flexible, trough-shaped base 2 joined to the latter.

What is claimed is:

1. A discoid cold cartridge insertable into an ice-cream maker and filled with a latent heat storage medium, comprising: a discoid main wall which cooperates with a scraper and stirrer tool of the ice-cream maker, said cold cartridge formed from at least two parts joined together, of which one part includes the discoid main wall facing the scraper and stirrer tool and the other part a through-shaped base, the discoid main wall which cooperates with the scraper and stirrer tool being made as a stable die-cast part whereby the formation of ice-cream on said main wall is uniformly scraped off, said discoid main wall also being provided with fins projecting into the cold cartridge for increasing the stability of said main wall and increasing the heat transfer rate between said main wall and heat storage medium whereby the uniform formation of ice-cream on said discoid main wall is promoted and obtained, at least one wall of the base being flexible so as to be adaptable to the change in volume of the latent heat storage medium in phase transition.

2. A cold cartridge according to claim 1, wherein the die-cast part has a curved shape.

3. A cold cartridge according to claim 2, wherein the curvature of the die-cast part is curved inward to be cap-shaped.

4. A cold cartridge according to claim 2, wherein the die-cast part is curved outwards.

5. A cold cartridge according to claim 2, wherein the bottom wall runs essentially parallel to the curvature of the die-cast part and that a sealable filling opening for the latent heat storage medium is provided in the one of the two curved walls which is curved outwards.

6. A cold cartridge according to claim 1, wherein the die-cast part is provided with a groove in the region of its circumference facing the base, and the trough-shaped base section is provided with an upper outwardly angled edge which fits into the groove of the die-cast part, and a clamping ring gripping over the angled edge of the base is inserted into the groove of the die-cast part to join together the base and the die-cast part.

7. A cold cartridge according to claim 1, wherein the bottom wall of the base is provided with beads.

8. A cold cartridge according to claim 1, wherein the trough-shaped base is composed of resiliently flexible plastic.

9. A cold cartridge according to claim 8 wherein the trough-shaped base is composed of transparent resiliently flexible plastic.

10. A cold cartridge according to claim 1 wherein a gas spring containing a yielding occluded gas is located inside the cartridge in the vicinity of the bottom wall.

11. A cold cartridge according to claim 10, wherein the gas spring consists of a foam rubber disc.

12. A cold cartridge according to claim 1, wherein an abutment is provided in the centre of the die-cast part for the scraper and stirrer tool of the ice-cream maker and, said abutment is raised from the die-cast part and usable as a handle.

13. A cold cartridge according to claim 12, wherein the abutment is a sealable filling opening for filling the cartridge with the latent heat storage medium.

14. A cold cartridge according to claim 1, wherein the ratio of the surface area in $cm^2$ of the discoid main wall serving to act together with the scraper and stirrer tool to the volume in cm$^3$ of the latent heat storage medium lies between the range of 0.3 and 0.6.

15. A cold cartridge according to claim 14, wherein the ratio of the surface area in cm$^2$ of the discoid main wall which acts with the scraper and stirrer tool to the volume of the latent heat storage medium in cm$^3$ is between 0.34 and 0.39.

16. A cold cartridge according to claim 1 which is filled with a latent heat storage medium comprising a eutectic mixture of water and a salt hydrate, which contains a further 0.1 to 6 percent by volume of a second water-salt hydrate eutectic, the melting point of which is lower than that of the pure latent heat storage medium.

* * * * *